(12) United States Patent
Leich et al.

(10) Patent No.: US 12,454,459 B2
(45) Date of Patent: Oct. 28, 2025

(54) FUNCTIONALIZED GRAPHENE, METHOD FOR PRODUCING A FUNCTIONALIZED GRAPHENE, AND ITS USE

(71) Applicant: Evonik Operations GmbH, Essen (DE)

(72) Inventors: Valeri Leich, Duisburg (DE); Jonas Hönig, Ingelheim am Rhein (DE); Julian Teichmann, Frankfurt am Main (DE); Silvia Blank-Shim, Aschaffenburg (DE); Stefan Schumann, Remscheid (DE); Verena Breuers, Haltern am See (DE); Patrik Stenner, Hanau (DE)

(73) Assignee: Evonik Operations GmbH, Essen (DE)

( * ) Notice: Subject to any disclaimer, the term of this patent is extended or adjusted under 35 U.S.C. 154(b) by 296 days.

(21) Appl. No.: 18/003,619

(22) PCT Filed: Jun. 15, 2021

(86) PCT No.: PCT/EP2021/066007
§ 371 (c)(1),
(2) Date: Dec. 28, 2022

(87) PCT Pub. No.: WO2022/002574
PCT Pub. Date: Jan. 6, 2022

(65) Prior Publication Data
US 2023/0264961 A1 Aug. 24, 2023

(30) Foreign Application Priority Data
Jul. 1, 2020 (EP) .................................... 20183456

(51) Int. Cl.
*C01B 32/194* (2017.01)
*C08K 9/06* (2006.01)
(Continued)

(52) U.S. Cl.
CPC .............. *C01B 32/194* (2017.08); *C08K 9/06* (2013.01); *C09D 7/62* (2018.01); *C10M 125/02* (2013.01);
(Continued)

(58) Field of Classification Search
CPC ................ Y02E 60/10; C10N 2040/25; C10N 2040/04; C01P 2006/11; C01P 2006/20;
(Continued)

(56) References Cited

U.S. PATENT DOCUMENTS 6,217,728 B1    4/2001   Lehmann et al.
6,503,386 B2    1/2003   Lehmann et al.
(Continued)

FOREIGN PATENT DOCUMENTS

CN    104342003    2/2015
CN    105056879    11/2015
(Continued)

OTHER PUBLICATIONS

U.S. Appl. No. 18/575,875, filed Jan. 1, 2024, Lehmann et al.
(Continued)

*Primary Examiner* — Vishal V Vasisth
(74) *Attorney, Agent, or Firm* — Grüneberg and Myers PLLC (57) ABSTRACT

A process can be used for the functionalization of graphene material by mixing graphene material with at least one silane. The functionalized graphene material is useful, for example, in thermoplastics.

18 Claims, 6 Drawing Sheets

Diagram of mode of operation of the three-roll mill (51) Int. Cl.

| | | |
|---|---|---|
| *C09D 7/62* | (2018.01) | |
| *C10M 125/02* | (2006.01) | |
| *H01M 4/587* | (2010.01) | |
| *C10N 40/04* | (2006.01) | |
| *C10N 40/25* | (2006.01) | |

(52) U.S. Cl.
CPC ......... *H01M 4/587* (2013.01); *C01P 2006/10* (2013.01); *C01P 2006/11* (2013.01); *C01P 2006/42* (2013.01); *C10M 2201/14* (2013.01); *C10M 2203/003* (2013.01); *C10N 2040/04* (2013.01); *C10N 2040/25* (2013.01)

(58) Field of Classification Search
CPC .............. C01P 2006/10; C01P 2006/42; C01P 2006/21; C10M 125/02; C10M 2201/14; C10M 2203/003; H01M 4/587; C01B 32/194; C01B 32/198; C09D 7/62; C08K 9/06

See application file for complete search history.

(56) References Cited

U.S. PATENT DOCUMENTS

| | | | |
|---|---|---|---|
| 6,685,818 | B2 | 2/2004 | Lehmann et al. |
| 8,486,157 | B2 | 7/2013 | Michel De Arevalo et al. |
| 9,199,211 | B2 | 12/2015 | Tschernjaew et al. |
| 9,530,952 | B2 | 12/2016 | Stenner et al. |
| 9,553,249 | B2 | 1/2017 | Busse et al. |
| 9,865,461 | B2 | 1/2018 | Mader et al. |
| 11,056,633 | B2 | 7/2021 | Hoch et al. |
| 2002/0014418 | A1 | 2/2002 | Lehmann et al. |
| 2002/0036147 | A1 | 3/2002 | Lehmann et al. |
| 2011/0037021 | A1 | 2/2011 | Tschernjaew et al. |
| 2011/0123424 | A1 | 5/2011 | Michel De Arevalo et al. |
| 2011/0302849 | A1 | 12/2011 | Stenner et al. |
| 2013/0240892 | A1 | 9/2013 | Stenner et al. |
| 2013/0328175 | A1 | 12/2013 | Stenner et al. |
| 2014/0275597 | A1 | 9/2014 | Zhang et al. |
| 2015/0047685 | A1 | 2/2015 | Stenner et al. |
| 2016/0155637 | A1 | 6/2016 | Mader et al. |
| 2016/0240763 | A1 | 8/2016 | Busse et al. |
| 2017/0218494 | A1 | 8/2017 | Busse et al. |
| 2018/0358536 | A1 | 12/2018 | Hoch et al. |
| 2019/0233702 | A1* | 8/2019 | Xu .................. C08K 3/04 |

FOREIGN PATENT DOCUMENTS

| | | |
|---|---|---|
| CN | 107459717 | 12/2017 |
| CN | 108947394 | 12/2018 |
| CN | 109504318 | 3/2019 |
| CN | 110527369 A | 12/2019 |
| CN | 108384406 B | 7/2020 |
| DE | 10048004 | 4/2002 |
| DE | 102018220013 | 5/2020 |
| EP | 3626758 | 3/2020 |
| EP | 3 002 310 | 11/2020 |
| JP | 2015-40211 | 3/2015 |
| JP | 2017532409 | 11/2017 |
| JP | 2019052083 | 4/2019 |
| KR | 10-2019-0074655 | 6/2019 |
| RU | 2018106922 | 4/2020 |
| WO | 2004/055243 | 7/2004 |
| WO | 2012/055693 | 5/2012 |
| WO | 2012/072406 | 6/2012 |
| WO | 2012/130620 | 10/2012 |
| WO | 2013/144107 | 10/2013 |
| WO | 2013/156406 | 10/2013 |
| WO | 2015/055252 | 4/2015 |
| WO | 2015/124343 | 8/2015 |
| WO | 2018/019905 | 2/2018 |
| WO | 2018/024778 | 2/2018 |
| WO | 2019/145307 | 8/2019 |
| WO | 2019/153842 | 8/2019 |
| WO | 2020/161230 | 8/2020 |
| WO | 2022/058095 | 3/2022 |
| WO | 2022/258470 | 12/2022 |
| WO | 2023/275135 | 1/2023 |

OTHER PUBLICATIONS

Amado et al., "Advances in SLS powder characterization", Department of Mechanical & Process Engineering, Swiss Inst. of Technology, Aug. 17, 2011, pp. 438-452.

Bera et al., "Nanotailoring of thermoplastic polyurethane by amine functionalized graphene oxide: Effect of different amine modifier on final properties", Composites Part B, vol. 195,108075, 2020, pp. 1-15.

International Search Report dated Sep. 17, 2021, in PCT/EP2021/066007, with English translation, 8 pages.

Ma et al., "Preparation and properties of 3-aminopropyltriethoxysilane functionalized graphene/polyurethane nanocomposite coatings", Colloid & Polymer Science, vol. 291, 2013, pp. 2765-2773.

Written Opinion dated Sep. 17, 2021, in PCT/EP2021/066007, with English translation, 12 pages.

Leich et al., U.S. Appl. No. 18/260,570, filed Jul. 6, 2023.

U.S. Appl. No. 18/260,570, filed Jul. 6, 2023, Leich et al.

U.S. Pat. No. 6,217,728, Apr. 17, 2001, Lehmann et al.

U.S. Pat. No. 6,503,386, Jan. 7, 2003, 2002/0014418, Lehmann et al.

U.S. Pat. No. 6,685,818, Feb. 3, 2004, 2002/0036147, Lehmann et al.

U.S. Pat. No. 9,199,211, Dec. 1, 2015, 2011/0037021, Tschernjaew et al.

U.S. Pat. No. 8,486,157, Jul. 16, 2013, 2011/0123424, Michel De Arevalo et al.

U.S. Appl. No. 13/202,512, filed Aug. 19, 2011, 2011/0302849, Stenner et al.

U.S. Appl. No. 13/991,261, filed Aug. 19, 2013, 2013/0328175, Stenner et al.

U.S. Appl. No. 13/885,316, filed May 14, 2013, 2013/0240892, Stenner et al.

U.S. Pat. No. 9,530,952, Dec. 27, 2016, 2015/0047685, Stenner et al.

U.S. Pat. No. 9,865,461, Jan. 9, 2018, 2016/0155637, Mader et al.

U.S. Pat. No. 9,553,249, Jan. 24, 2017, 2016/0240763, Busse et al.

U.S. Appl. No. 15/515,172, filed Mar. 29, 2017, 2017/0218494, Busse et al.

U.S. Pat. No. 11,056,633, July 6, 2021, 2018/0358536, Hoch et al.

\* cited by examiner

Fig. 1. Diagram of mode of operation of the three-roll mill

Fig. 2. Heubach Dustmeter type I dust generation equipment.

Fig. 3. Tamping volumeter (from: ISO 787-11, as at October 1995)

Fig. 4 Bulk and tamped densities of graphene material (unfunctionalized, functionalized).

Fig. 5 Bulk density of the graphene material functionalized according to the invention, as function of the quantity of silane GLYEO used.

Fig. 6. Functional principle of the Revolution Powder Analyzer (diagrammatic).

Fig. 7. Average angle of the surface of the functionalized material at beginning of avalanche, averaged from 150 avalanches, as a function of mass fraction of silane GLYEO.

Fig. 8 Images from flowability measurements on functionalized graphene material with various mass fractions in % by weight of GLYEO silane, determined in the Revolution Analyzer.

Fig. 9. Avalanche angle of the functionalized graphene material having different proportions of silane GLYEO, before and after performance of the mixing program.

Fig. 10. Avalanche energy of GLYEO-silane-functionalized graphene material as function of the mass fraction of silane.

FUNCTIONALIZED GRAPHENE, METHOD FOR PRODUCING A FUNCTIONALIZED GRAPHENE, AND ITS USE

CROSS-REFERENCE TO RELATED APPLICATIONS

This application is the National Stage entry under § 371 of International Application No. PCT/EP2021/066007, filed on Jun. 15, 2021, and which claims the benefit of priority to European Application No. 20183456.1, filed on Jul. 1, 2020. The content of each of these applications is hereby incorporated by reference in its entirety.

BACKGROUND OF THE INVENTION

Field of the Invention

The present invention relates to a process for the functionalization of graphene material, to the functionalized graphene material itself, and to the use thereof.

Description of Related Art

Graphene and production, properties and applications thereof are discussed in detail in the technical literature, for example in Römpp online, https://roempp.thieme.de/lexicon/RD-07-02758.

Just as in graphite, each carbon atom in graphene is linked covalently to three neighbouring atoms by a sigma bond. The C,C bond length is 142 pm. The atoms are sp² hybridized, and the sigma bonds lie within a single plane. Graphite accordingly has a planar structure. A partially filed p, orbital remains on each atom. These p, orbitals are orthogonal to the plane of the bonds and form a delocalized pi-electronic system which is of primary importance in determining the electronic properties of graphene.

Crystallographically, graphene can be described by two equivalent sublattices having the unit cell vectors $\vec{a} = \vec{b} = 0.246$ nm, the angle between these being 60°. The unit cell consists of two carbon atoms at the respective positions (0, 0) and (a/3, 2b/3). The atomic density is therefore 38.2 $nm^{-2}$.

For the purposes of the invention, the expression "graphene material" means material(s) in accordance with ISO/TS 80004-13, namely
graphene,
graphenic carbon materials,
mono-, bi- and trilayer graphene.
epitaxial graphene,
exfoliated graphene,
few-layer graphene,
multilayer graphene,
few-layered nanoribbons,
graphene nanoplate,
graphene nanoplatelet,
graphene nanosheet,
graphene microsheet,
graphene nanoflakes,
graphene nanoribbon,
graphene oxide,
graphene oxide nanosheet,
multilayer graphene oxide,
graphene quantum dot,
graphite:
graphite nanoplate,
graphite nanosheet,
graphite nanoflake,
graphite oxide,
reduced graphene oxide.
or a mixture of these materials.

Graphene materials are used in a large number of technical fields.

By way of example, CN 109504318 A presents a process for using oxidized graphene and aluminium oxide to modify polystyrene films for flexible printed circuits.

The patent application WO 2018019905 A1 discloses a process for coating a metal substrate with one or a few monolayers of graphene using a binder substance.

WO 2015055252 A1 discloses vinylsilanes which can be used in rubber mixtures comprising graphene materials, for example in the production of tyres.

CN 104342003 A presents dust- and bacteria-repellent aqueous coating materials for glass doors. Graphene, inter alia, is used in the production of said coating materials.

CN 105058579 A teaches how mechanical properties of asphalt can be improved by a composition comprising polyester fibres and graphene.

Production of vulcanized rubber mixtures can use concentrates comprising graphene and sulfonamides in addition to other materials. CN 107459717 A discloses such concentrates and the production processes thereof.

Graphene material is also used for protection from rotting in construction materials. According to the teaching of CN 108947394 A, modified graphene oxide is incorporated into Portland cement, in addition to other materials.

WO 2019145307 A1 discloses compositions comprising polymeric inorganic nanoparticles and the use of said compositions in glidants and lubricants on metallic surfaces. Nanoparticles used include graphene.

Graphene materials are obtainable commercially as powders and often have very low bulk densities, for example in the range between 2 and 400 g/l. In addition to the low bulk densities, most graphene materials also have poor flowability and/or generate high dust content during transfer by gravity-driven flow. This leads to poor handling properties and to problems during weighing-out and metering, and must also be considered critical from environmental protection and workplace safety viewpoints.

The poor handling properties are apparent by way of example when the powders are incorporated in elastomeric systems, as is the case during the kneading of rubber: The correct timing, and the duration, of incorporation of pulverulent fillers are vital factors in the production of a good filled compounded rubber material. Said fillers are tipped through hoppers into the mixing chamber and then pushed by a pneumatic plunger towards rotating rolls.

The prior art specifically discloses methods for using silanes or siloxanes to improve, or to permit, the dispersion of graphene materials, or else other fillers, in matrix systems. This is mostly achieved by using silanes in substoichiometric quantities.

However, there continues to be a demand for a technical procedure that can handle, or avoid, the quantities of dust that arise during the use of pulverulent graphene materials, because firstly dusts lead to contamination problems and make it difficult to measure the quantity of filler that has actually been introduced into the matrix system, and secondly, for reasons of environmental protection and workplace safety, it is essential that dusts are removed by extraction or by other means.

Furthermore, the dusts and the generally low bulk density of the graphene material increase the cost of introducing said material into the desired matrix system. Corresponding problems arise for example when a thermoplastic compounded material filled with a graphene material is produced in an extruder. For said reasons it can be difficult or impossible to ensure the correct timing of introduction of pulverulent graphene material during the process for production of thermoplastic systems.

SUMMARY OF THE INVENTION

It was therefore an object of the present invention to process graphene material into a product which has improved flowability and/or greater bulk density and which, during processing, produces less dust, and which can therefore be incorporated more successfully into commercially relevant matrix systems.

Surprisingly, it has been found that this object can be achieved with silane-functionalized graphene materials.

The invention provides a process for the functionalization of graphene material
which is characterized in that the graphene material is reacted at least partially with at least one silane, wherein the at least one silane has the structure Y—Si $(OR^1)(OR^2)(OR^3)$ and Y is an alkyl moiety, olefin moiety or aromatic moiety, in each case branched or unbranched, a combination of these moieties, or a functional organic group,
selected from: carboxy, carbonyl, hydroperoxycarbonyl, halogenyl, sulfo, sulfino, sulfeno, cyano, formyl, oxo, thioxo, hydroxy, amino, imino, hydrazino, epoxy, sulfanyl, fluoro, a combination of these groups, or a combination of alkyl, olefin or aromatic moiety and of said functional organic group, and
$R^1$, $R^2$, $R^3$ are alkyl, olefin or aromatic moieties which are branched or unbranched and are pairwise identical or nonidentical, and the at least partial reaction is carried out during mixing of the silane(s) with the graphene material.

After performance of the process of the invention, graphene materials are obtained in the form of a granulate.

For the purposes of the invention, the meaning of the term "granulate", based on the definition in Römpp online, https://roempp.thieme.de/35IDR, is an agglomeration of asymmetrical aggregates made up of powder particles. The aggregates have uneven surfaces and have no uniformly geometrical shape. Granulates can be characterized by determining bulk density in accordance with DIN ISO 697: 1984-01 and determining the angle of repose in accordance with DIN ISO 4324: 1983-12.

The process of the invention has the advantage that it is very easy to carry out and thereby provides graphene material that, when compared with conventional graphene materials, produces less dust and has significantly better flowability. Added value is thus realized on dispersion in various matrix systems, irrespective of the dispersion method.

DETAILED DESCRIPTION OF THE INVENTION

The invention is explained in more detail below.

It can be advantageous in the process of the invention to use two or more silanes in which Y or $R^1$, $R^2$, $R^3$ are pairwise identical or nonidentical.

The at least one silane can preferably be selected from 3-glycidyloxypropyltriethoxysilane, abbreviated to GLYEO, 3-aminopropyltriethoxysilane, abbreviated to AMEO, glycidyloxypropyltrimethoxysilane, abbreviated to GLYMO, and 3-aminopropyltrimethoxysilane, abbreviated to AMMO, or from a mixture of these silanes.

The at least one silane can more preferably be selected from bis(triethoxysilylpropyl) tetrasulfide, bis(triethoxysilylpropyl) disulfide, 3-thiocyanatopropyltriethoxysilane, gamma-aminopropyltriethoxysilane, Dynasylan® SIVO 214, gamma-aminopropyltrimethoxysilane, bis(triethoxysilylpropyl)amine, bis(trimethoxysilylpropyl)amine, N-beta-(aminoethyl)-gamma-aminopropyltrimethoxysilane, N-beta-(aminoethyl)-gamma-aminopropyltrimethoxysilane, triaminofunctional silane, benzylaminosilane (50% in MeOH), benzylaminosilane (60% in water), vinylbenzylaminosilane (42%~in MeOH), vinylbenzylaminosilane (40% in water), polyazamide silane (53% in MeOH), quaternary amine silane (48% in water), methacrylamidosilane (40% in water), gamma-aminopropylsilanol (40% In water), gamma-aminopropylsilanol (88% in water), vinyl-aminoalkylsilanol (60% In water), VPS 1208, triaminofunctional silanol (40% In water), 3-ureidopropyltrimethoxysilane, 3-ureidopropyltriethoxysilane (50% in methanol), 3-ureidopropyltriethoxysilane (with 10% EtOH), gamma-glycidoxypropyltrimethoxysilane, gamma-glycidoxypropyltriethoxysilane, gamma-methacryloxypropyltrimethoxysilane (MEMO), gamma-methacryloxypropyltriethoxysilane (MEEO), vinyltrimethoxysilane (VTMO), vinyltriethoxysilane (VTEO), oligomeric alkylsilane (50% in water), polyether-functional trimethoxysilane, vinyltrimethoxysilane (VTMO), 3-methacryloxypropyltrimethoxysilane (MEEO), 3-methacryloxypropyltrimethoxysilane (MEMO), octyltrimethoxysilane (OCTMO) and octyltriethoxysilane (OCTEO), or from a combination of these silanes.

All of the silanes which can be used with preference are obtainable from *Evonik Resource Efficiency GmbH, Rodenbacher Chaussee* 4 In 63457 Hanau, Germany.

The silane can particularly preferably be selected from 3-glycidyloxypropyltriethoxysilane (GLYEO), 3-aminopropyltriethoxysilane (AMEO), glycidyloxypropyltrimethoxysilane (GLYMO) and 3-aminopropyltrimethoxysilane (AMMO) or from a mixture of these silanes.

With very particular preference glycidyloxypropyltriethoxysilane (GLYEO) can be used.

The sum of the mass fractions of the at least one silane in the process of the invention can be in the range of 0.1% to 70% by weight, preferably of 5% to 50% by weight, more preferably or 25% to 40% by weight, wherein the sum of the mass fractions of the silane(s) and of the graphene material is 100% by weight.

If the total employed mass fraction of the silane(s) Is 50% by weight, the gravimetric ratio of graphene material to silane(s) present is 1:1.

The at least partial reaction in the process of the invention can be carried out a temperature in the range of 50° C. to 150° C., preferably in a range of 80° C. to 110° C. The temperature can additionally be adjusted according to the nature of the at least one silane, the graphene material and mode of mixing procedure.

The mixing procedure in the process of the invention can preferably use a mixing granulator, a vessel with grinding balls, a ball mil, a three-roll mill, a stirrer or a vessel equipped with paddles.

The functionalization in the process of the invention provides, without compaction, a granulate which has higher bulk density and tamped density than the unfunctionalized graphene material. This is surprising because conventional methods for producing granulates generally require compaction. However, it can be advantageous for the mixing procedure in the process of the invention to include compaction, for example by using a three-roll mill.

A granulate is obtained in the described process, with or without compaction, if the at least one silane is used in a mass fraction of at least 5% by weight, particularly preferably at least 10% by weight, more preferably 0.1% to 70% by weight, with preference 5% to 50% by weight, more preferably 25% to 40% by weight, wherein the sum of the mass fractions of the silane(s) and of the graphene material is 100% by weight.

It can additionally be advantageous to prepare the at least one silane before the mixing procedure. Such preparation is carried out in the inventive Examples. This preparation provides prefunctionalization of the at least one silane.

In a preferred method, a defined quantity of the at least one silane can be added to an alcohol-water mixture, particularly preferably to an ethanol-deionized-water mixture, very particularly preferably to a mixture of 95% by volume of ethanol and 5% by volume of deionized water, and the resultant preparation can be stirred at room temperature during a certain period, preferably of 1 to 100 min, particularly preferably about 10 min.

It can additionally be advantageous to use an acid, preferably HCl, to adjust deionized water to a defined pH, preferably to a pH in the range of 4.5 to 5.5. A defined quantity of the at least one silane can then be added to this preparation and the resultant preparation stirred at room temperature during a certain period, preferably of 1 to 100 min, particularly preferably about 10 min.

It can likewise be advantageous to add a defined quantity of the at least one silane to ethanol (analytical grade), and to stir the resultant preparation at room temperature during a certain period, preferably or 1 to 100 min, particularly preferably about 10 min.

In all of these options it can be advantageous when the phase then obtained is clear.

The preferred preparation procedures differ from the conventional procedure in that the prefunctionalization uses only water or a water-ethanol mixture.

For the purposes of the invention, the expression "room temperature" means a temperature of 20° C.

As already mentioned, the process or the invention provides functionalized graphene material which, in comparison with conventional graphene material, has increased bulk density and tamped density. The processing thereof moreover produces significantly less dust, as shown in the Examples. In particular, the functionalized graphene material obtained according to the invention can be incorporated more successfully into various matrix systems. Furthermore, the supply of the functionalized graphene material obtained according to the invention to such systems can be achieved more rapidly and/or with less complexity.

It is moreover surprising that, in comparison with unfunctionalized graphene material, the flowability of the graphene material functionalized according to the invention shows surprisingly little change or is better.

Figure 6:
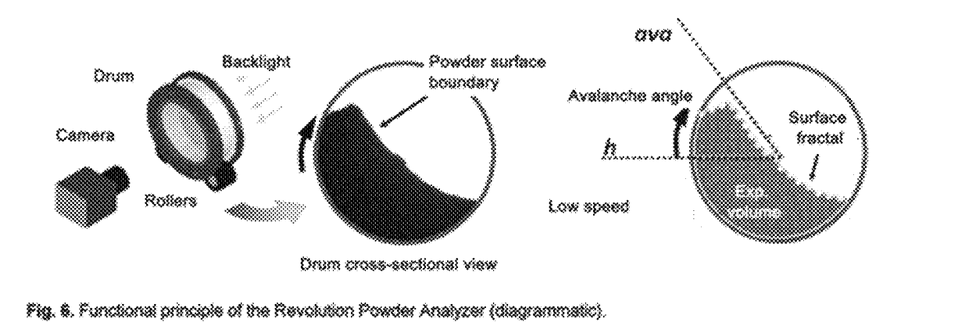
FIG. 6 shows a diagram of the functional principle of a Revolution Powder Analyzer.

For the purposes of the invention, flowabilty is determined, as shown diagrammatically in FIG. 6, by adding a defined quantity to a drum and subjecting the drum to uniform rotational motion. A camera is then used to determine the angle from which the material begins to form avalanches. The respective direction of the rotational motion is shown in FIG. 6 by an arrow. A smaller value for this "avalanche angle" (ava,h), as it is known for the purposes of the invention, between the surface formed by the particles and the horizontal (h) at the time of onset of the avalanche indicates greater, i.e. better, flowability of the material. The avalanche angle between (ava) and the horizontal (h) is measured in the mathematically positive direction. Details of the determination of flowability can be found for example in the following article by Amado, "Advances in SLS powder characterization", 22nd Annual International Solid Freeform Fabrication Symposium—An Additive Manufacturing Conference, SFF, 2011, pp. 438-452.

It can be advantageous to use a mass fraction of at least 30% by weight of the at least one silane in the process of the invention. At such mass fractions and higher, the avalanche angle decreases with increasing proportion of the at least one silane. Mass fractions of the at least one silane that can preferably be used are in the range of 30% to 70% by weight, preferably of 30% to 50% by weight, more preferably of 30% to 40% by weight, wherein the sum of the mass fractions of the silane(s) and of the graphene material is 100% by weight.

The invention therefore likewise provides a functionalized graphene material obtained by the process of the invention.

It is preferable that the functionalized graphene material of the invention, or obtained according to the invention, has a bulk density of 300 g/l to 900 g/l, more preferably of 500 g/l to 800 g/l, and/or has a tamped density of 300 g/l to 900 g/l, preferably of 500 g/l to 800 g/l, and/or exhibits a reduction in dust generation of 50% to 80%, preferably of 55% to 75%.

The bulk density and tamped density of graphene material functionalized according to the invention and of unfunctionalized graphene material are determined for the purposes of the invention in accordance with DIN 53912 and DIN/ISO 787 respectively.

Dust generation is determined for the purposes of the invention by using Heubach Dustmeter type I dust-generation equipment in the rotation method in accordance with DIN 55992.

The result of the determination of dust generation in the Examples was the mass of dust respectively produced with unfunctionalized graphene material and with graphene material functionalized according to the invention. For the purposes of the invention, the reduction of dust generation is the ratio of the difference between the mass of dust determined in accordance with DIN 55992 for the unfunctionalized graphene material and the mass of dust for the graphene material functionalized according to the invention and the mass of dust for the unfunctionalized graphene material, stated in %.

By virtue of the flowability which, as a further mentioned advantage of the functional zed graphene material of the invention, or obtained according to the invention, is unchanged or improved by the mass fraction of the at least one silane, said material can be used in at least the same application areas as the unfunctionalized material, but can be processed more easily and does not have the disadvantages mentioned of the conventional graphene material.

The invention therefore likewise provides for the use of the functionalized graphene material of the invention, or obtained according to the invention, as corrosion protection in coatings, for anti-icing, as active material and/or electrode material in batteries. In composite materials and/or foams for the alteration of mechanical, thermal, electrical and tribological properties, and also of flame retardancy, in tyre rubber, in transmission oil and/or engine oil, in metalworking, or in membranes.

In tyre rubber, the use according to the invention has the advantage of improving the thermal and/or electrical properties, and also improving rolling resistance, wet grip performance and abrasion. The described use in oils improves tribological properties such as friction, abrasion and heat dissipation.

The functionalized graphene material of the invention, or obtained according to the invention, can preferably be used in thermoplastics selected from standard thermoplastics, preferably PE, PP, PS, PVC, in engineering thermoplastics, preferably PET, PMMA, PC, POM, PA.

in high-performance thermoplastics, preferably PPS, PEEK, PES, in copolymers, elastomers, preferably silicones, more preferably RTV, HTV, LSR, in polyurethanes, rubbers, preferably SBR, BR, natural rubber, in thermosets, preferably polyurethanes, polyester resins, phenolic resins, epoxy resins, acrylate resins, silicone resins, in solvents, preferably aprotic-nonpolar, aprotic-polar, or protic solvents.

or oils, preferably mineral oils, silicone oils, process oils.

The invention is illustrated below by way of examples.

Example A: Functionalization of Graphenes in the Flask

The silane GLYEO was prepared as follows before use thereof:

HCl was used to adjust a quantity of 3 ppw of an ethanol-deionized-water mixture (95% by volume ethanol, 5% by volume deionized water) to a pH in a range of 4.5 to 5.5. A syringe was then used to carefully add a quantity of 1 ppw of the silane and the mixture was stirred at room temperature for about 10 min. This resulted in prefunctionalization of the silane. A clear phase was obtained.

Graphene oxide was selected as graphene material.

A quantity of 4 ppw of the graphene oxide was charged to a round-necked flask equipped with paddles and a quantity of 4 ppw of the prepared clear phase was added.

The partial reaction took place in a rotary evaporator at 100° C. under a pressure of 30 hPa during 3 h.

The resultant graphene material functionalized according to the invention was then purified of excess silane with ethanol (analytical grade) in a Soxhlet apparatus, predried overnight in a fume hood with the extraction system running, and then dried in a rotary evaporator at 100° C. and a pressure of 30 hPa during 3 h.

Example B: Functionalization of Graphene in a Laboratory Mixer/Granulator

The silane GLYEO was prepared as follows before use thereof:

HCl was used to adjust a quantity of 3 ppw of deionized water to a pH in the range of 4.5 to 5.5. A syringe was used to carefully add a quantity of 1 ppw of the silane and the mixture was stirred at room temperature for about 10 min.

A clear phase was obtained.

Graphene oxide was selected as graphene material.

A quantity of 4 ppw of this graphene material and 4 ppw of a clear phase were charged to a laboratory mixer-granulator. The partial reaction took place in the mixing vessel at 100° C. and at a rotation rate of 300 rpm during 3 h.

The resultant graphene material functionalized according to the invention was then purified of excess silane with ethanol (analytical grade) in a Soxhlet apparatus, predried overnight in a fume hood with the extraction system running, and then dried in a rotary evaporator at 100° C. and a pressure of 30 hPa during 3 h.

Example C: Functionalization of Graphene in a Ball Mill

The silane GLYEO was prepared as follows before use thereof:

The apparatus was charged with 3 ppw of ethanol (analytical grade). A syringe was used to carefully add a quantity of 1 ppw of the silane and the mixture was stirred at room temperature for about 10 min.

A clear phase was obtained.

Graphene oxide was selected as graphene material. A quantity of 4 ppw of this graphene material and 4 ppw of the clear phase were added to the grinding vessel of a ball mill. 4 ppw of grinding balls having diameters of 2 to 10 mm were additionally added thereto. The partial reaction took place in the ball mill at a rotation rate of 600 rpm during 15 min.

The resultant graphene material functionalized according to the invention was then purified of excess silane with ethanol (analytical grade) in a Soxhlet apparatus, predried overnight in a fume hood with the extraction system running, and then dried in a rotary evaporator at 100° C. and a pressure of 30 hPa during 3 h.

Example D: Functionalization of Graphene in a Three-Roll Mill

The silane GLYEO was prepared as follows before use thereof:

The apparatus was charged with 3 ppw of ethanol (analytical grade). A syringe was used to carefully add a quantity of 1 ppw of the silane and the mixture was stirred at room temperature for about 10 min. A clear phase was obtained.

Graphene oxide was selected as graphene material. A quantity of 4 ppw of this graphene material and a quantity of 4 ppw of the clear phase were added to a glass beaker.

The reaction mixture was homogenized by stirring with a metal spatula. The mixture was then scattered slowly and uniformly onto the rolls of a three-roll mil. The rolls of the mill consisted of SIC and were temperature-controlled by means of an oil bath to an oil temperature of 100° C. and a measured surface temperature on the rolls of 60° C. An infrared thermometer was used to monitor the temperature.

Figure 1:
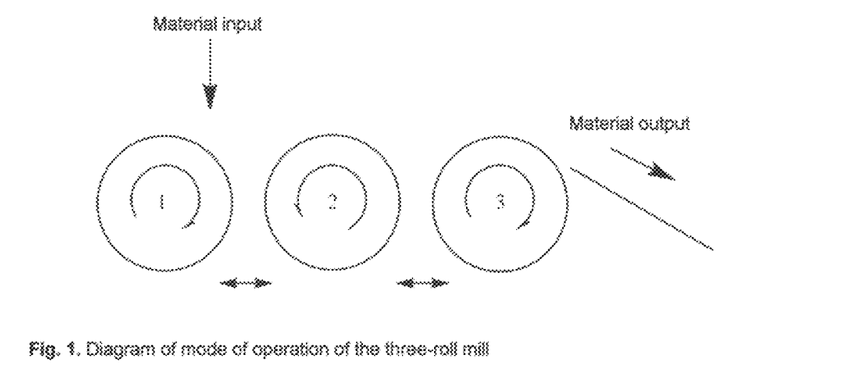
FIG. 1 shows a diagram of a mode of operation of a three-roll mill.

The rolls were operated with different rotation rates and directions of rotation, specifically: roll 1 with a rotation rate of 12 rpm, roll 2 at 38 rpm and roll 3 at 110 rpm. This is shown diagrammatically in FIG. 1.

A defined distance was set between the rolls, specifically: a distance of 15 μm between roll 1 and roll 2 and a distance of 5 μm between roll 2 and roll 3.

A pressure in the range from 1 to 6 $N/mm^2$ was applied here, depending on the quantity of material applied. The material was discharged by way of a scraper positioned on roll 3.

The resultant graphene material functionalized according to the invention was then purified of excess silane with ethanol (analytical grade) in a Soxhlet apparatus, predried overnight in a fume hood with the extraction system running, and then dried in a rotary evaporator at 100° C. and a pressure of 30 hPa during 3 h.

Example E: Determination of the Properties of the Functionalized Graphene

1) Determination of Dust Generation in Accordance with DIN 55992-1 (Version June 2006).

Figure 2:
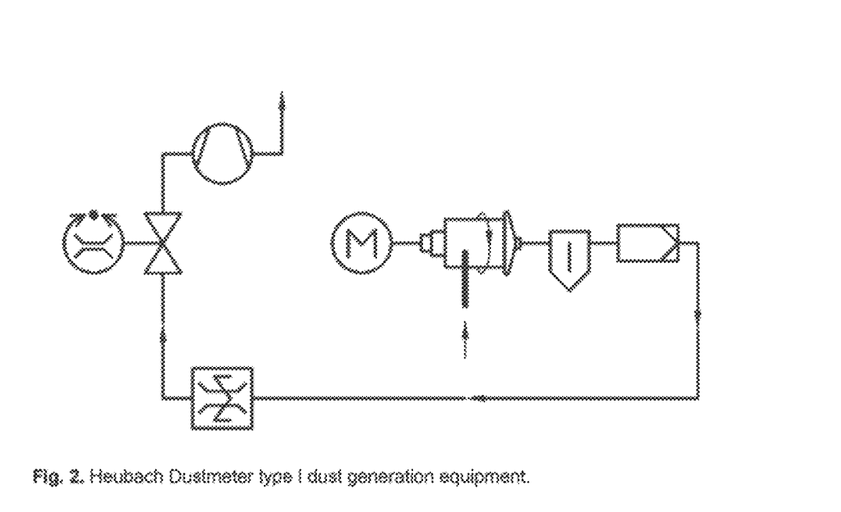
FIG. 2 shows a diagram of a Heubach Dustmeter type I dust-generation equipment.

Heubach Dustmeter type I dust-generation equipment, shown diagrammatically in FIG. 2, was used. The construction details of this equipment are known to the person skilled in the art.

Graphene oxide was selected as graphene material.

The rotation method was used to determine the quantity of dust produced with unfunctionalized graphene material and with graphene material functionalized according to the invention. The standard settings in accordance with DIN 55992-1 were selected:

30 revolutions/min

Air flow rate 20 L/min

100 L 5 min

Determinations of dust generation were first undertaken with various quantities of the unfunctionalized graphene material graphene oxide. With a larger quantity of graphene material, i.e. with a greater starting weight, the quantity of dust liberated was increased; this had a positive effect on experimental error. However, it was observed that an excessively high sample weight could cause blockage of the air pathway in the equipment, resulting in the quantity of dust liberated being underestimated. Such results were rejected. Table 1 shows the results of the determination.

TABLE 1

Dust generation on unfunctionalized graphene material.

| Initial sample weight in g | Mass in g in filter | % dust |
|---|---|---|
| 5.0 | 0.1692 | 3.4 |
| 7.5 | 0.2223 | 3.0 |

The unfunctionalized graphene material liberated 3.4% dust with a sample weight of 5 g and 3.0% dust with a sample weight of 7.5 g. This dust was in each case collected in a filter and weighed. In both determinations, 100 l air were sucked through the Dustmeter in the prescribed time.

Dust generation was then determined on the graphene material functionalized according to the invention from Example C, and specifically with sample weights of 5 g and 7.5 g of the functionalized graphene materials. Table 2 shows the results of the determination.

TABLE 2

Dust generation in graphene material functionalized according to the invention.

| Initial sample weight, g | Mass in filter, g | % dust | Reduction in dust due to functionalization |
|---|---|---|---|
| 5.0 | 0.0497 | 1.0 | 68% (5 g sample weight) |
| 7.5 | 0.0718 | 1.0 | 68% (7.5 g sample weight) |

The mass of dust determined in the filter in these experiments was significantly smaller than in the case of the unfunctionalized graphene material. 1.0% dust was liberated during the measurement using 5 g of graphene material functionalized according to the invention. In comparison with the unfunctionalized graphene material this corresponded to a reduction of 68%. A similar reduction in dust liberation of 68% was achieved with a sample weight of 7.5 g.

2) Determination of Bulk Density and Tamped Density.

Figure 3:
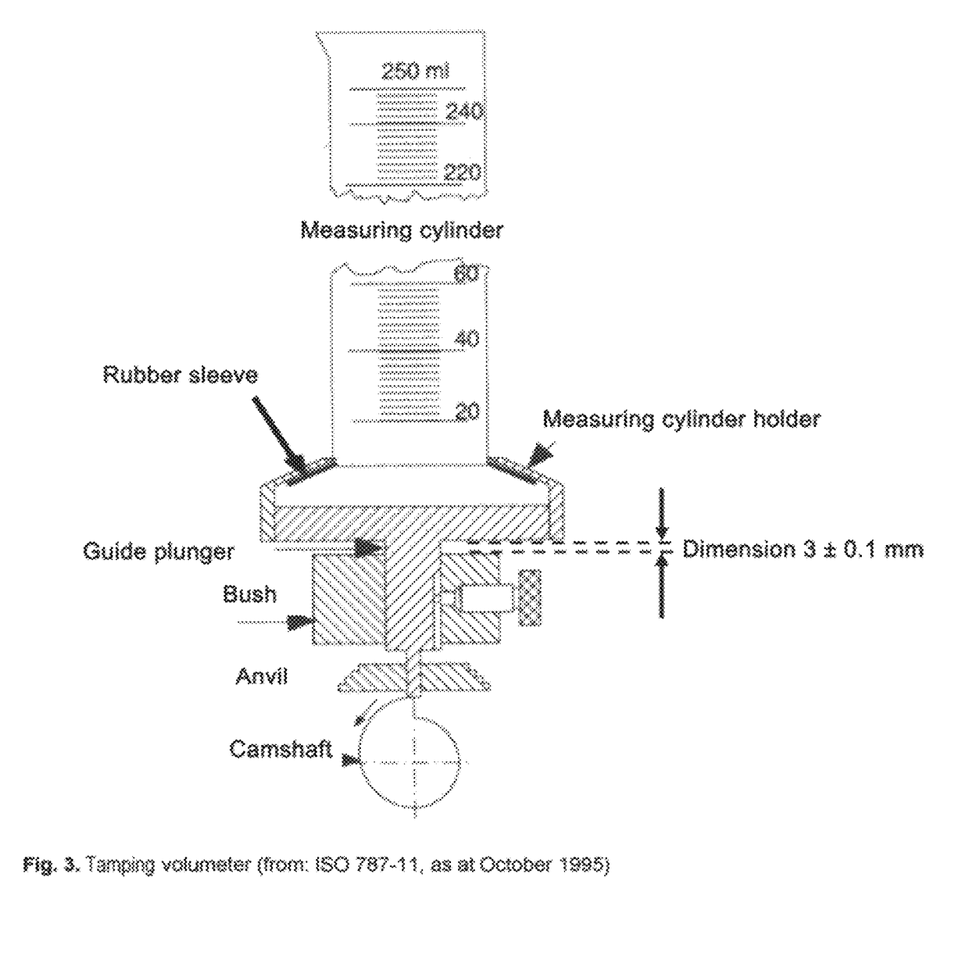
FIG. 3 shows a diagram of a tamping volumeter used to determine the bulk density and tamped density of a functionalized graphene material and of a unfunctionalized graphene material.

A jolting volumeter was used to determine the bulk density and tamped density of the graphene material functionalized according to the invention and of the unfunctionalized graphene material based on DIN 53912 and DIN/ISO 787. The Jolting volumeter is shown diagrammatically in FIG. 3.

The graphene material functionalized according to the invention comprised agglomerates having diameters below 0.5 mm. These were not removed because this would have led to mass losses of a magnitude such that no representative analysis of the bulk material would then have been possible.

For the determination of bulk density, the respective material was added slowly by way of a funnel to a tared 100 ml measuring cylinder. Once the filling process had ended, a wait time of 1 min was allowed in order to permit escape of air, so that the fill level achieved after the escape of air was constant. It was necessary here to avoid movement of the measuring cylinder, and the fill level was at most smoothed with a spatula if necessary.

Once the fill level had been noted, the mass of material present in the cylinder was determined. The bulk density is calculated by dividing mass by fill volume. The densities were determined twice for each material. For the determination of tamped density, the measuring cylinder was mechanically tamped 1250 times in accordance with DIN/ISO 787.

Figure 4:
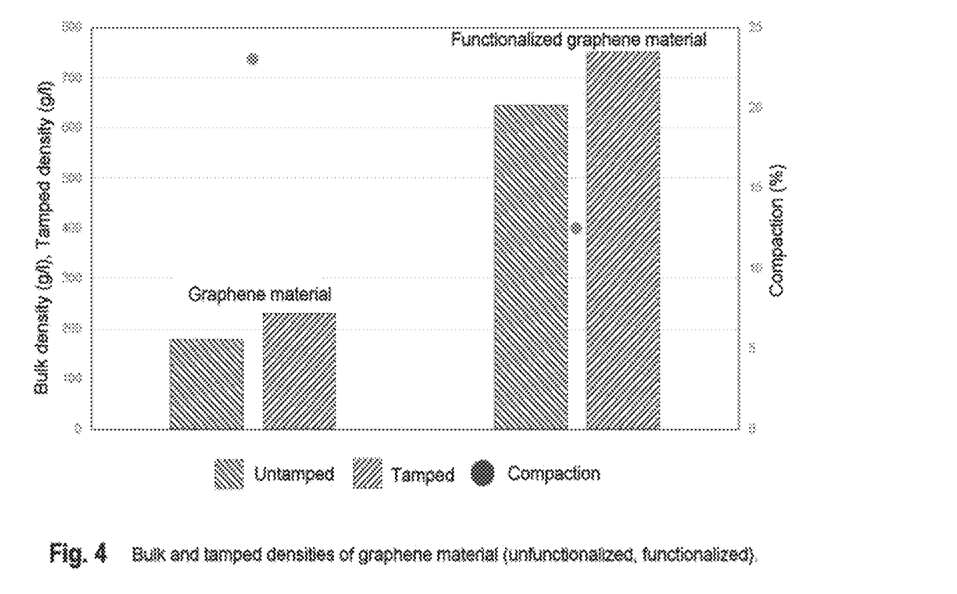
FIG. 4 shows a diagram showing bulk and tamped densities of a functionalized graphene material and of a unfunctionalized graphene material.

The results are shown in FIG. 4. Bulk density in the case of the graphene material functionalized according to the invention with GLYEO was above 600 g/l, more than three times higher than the 177 g/l of the unfunctionalized graphene material. The tamped density of this functionalized graphene material, being above 700 g/l, was also more than three times higher than the 230 g/l of the untreated graphene. The process of the invention has therefore resulted in graphene material that is more compact.

FIG. 4 additionally expresses "compaction" as the ratio of bulk density and tamped density in percent.

Figure 5:
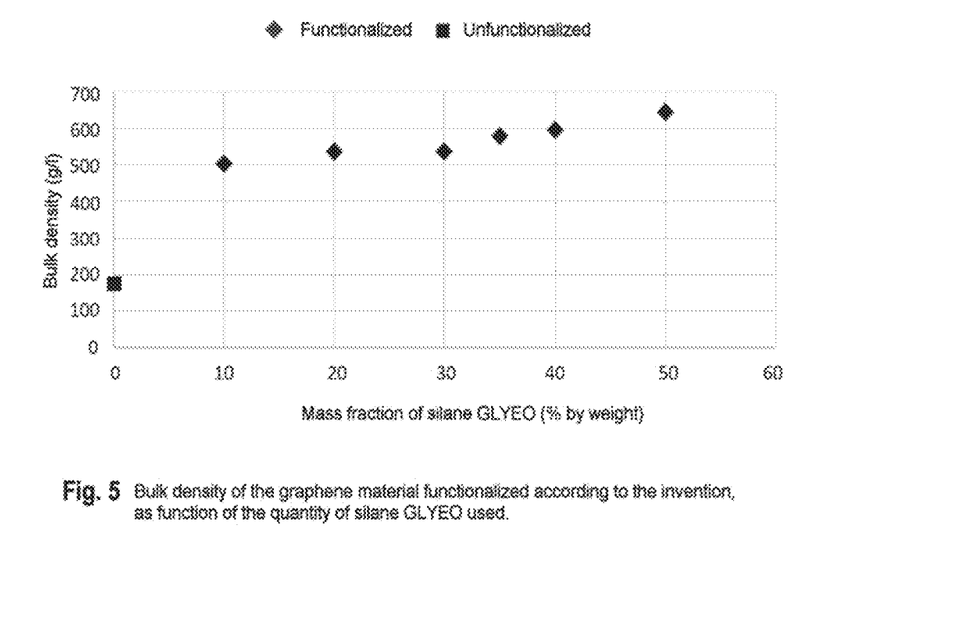
FIG. 5 shows a diagram showing bulk density of graphene material functionalized according to the invention, as a function of the quantity of silane GLYEO used.

FIG. 5 shows the effectiveness of the process of the invention on the basis of the relation between the bulk density of the graphene material functionalized according to the invention and the quantity of silane GLYEO used.

The mass fraction of the silane GLYEO was varied here between 10% and 50% by weight. Beginning at a bulk density of 502 g/l with use of 10% by weight of GLYEO, this was found to be increased to a value of about 650 g/l on use of 50% by weight of GLYEO. A linear relationship between the proportion of GLYEO and the bulk density can be discerned in FIG. 5.

3) Determination of Flowability.

The Revolution Powder Analyzer, model Rev2015, from PS Prozesstechnik GmbH was used to determine the effect of the inventive functionalization of the graphene material on the flowability thereof. As FIG. 6 shows, a defined quantity was added here to a rotating drum, and a camera was used to determine the angle at which the material began to form avalanches. A smaller avalanche angle (ava,h) between the surface formed by the particles and the horizontal (h) at the time of the avalanche indicates better flowability of the material. The avalanche angle was measured between (ava) and the horizontal (h) in the mathematically positive direction. The mode of operation of the Powder Analyzer is known to the person skilled in the art, as also are the variables measured therewith. Details of the determination of flowability can be found for example in the following article by Amado, "Advances in SLS powder characterization", 22nd Annual International Solid Freeform Fabrication Symposium—An Additive Manufacturing Conference, SFF, 2011, pp. 438-452.

In accordance with the manufacturer's instructions, 100 ml of the material were used in a PET drum having a diameter of 100 mm. For the measurement of fill volume, air pockets were removed in accordance with the instructions by agitation, but not tamping.

Figure 7:
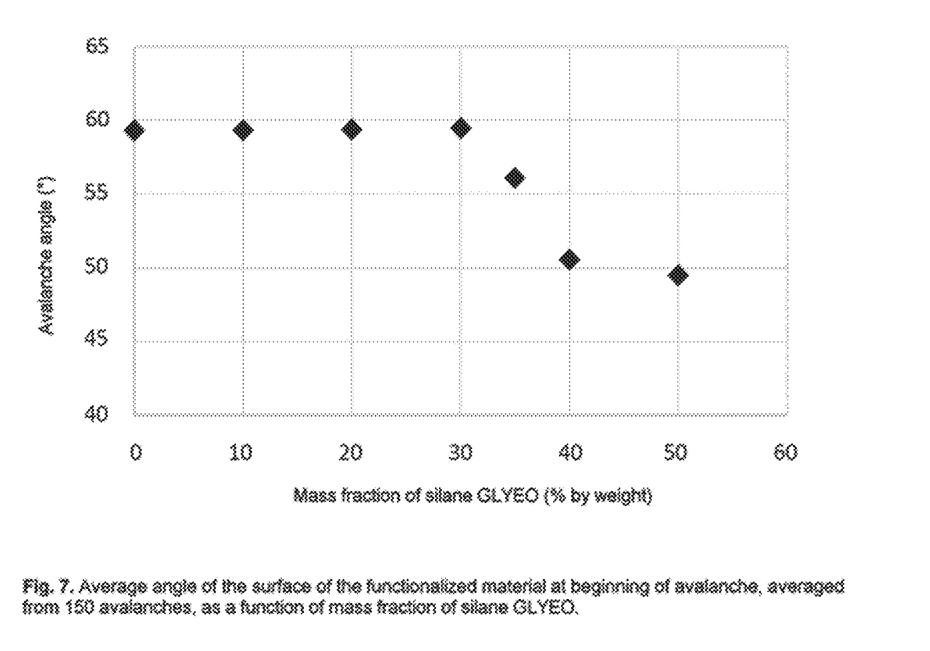
FIG. 7 shows a diagram showing an average angle of a surface of a functionalized material at a beginning of avalanche, averaged from 150 avalanches, as a function of mass fraction of silane GLYEO.

The measurement parameters of the flowability program corresponded to the standard settings for dark powder:
  0.5 rpm
  150 avalanche onsets
  Avalanche threshold 0.85%
  Camera: Shutter speed 6 ms, gain 6 dB (black powder), 10 frames per second FIG. 7 shows the average angles or the respective powder surface from 150 avalanches for graphene materials produced according to the invention with various proportions of silane GLYEO. A larger angle at the start of avalanches indicated poorer flow of the material. Flowability was found to remain constant with addition of 0% to 30% by weight of silane.

Above 30% by weight of silane GLYEO, the avalanche angle decreased with increasing proportion of silane from about 60° to below 50° at 50% by weight of silane GLYEO. Flowability was accordingly found to be significantly improved by addition of more than 30% by weight of silane GLYEO.

Figure 8:
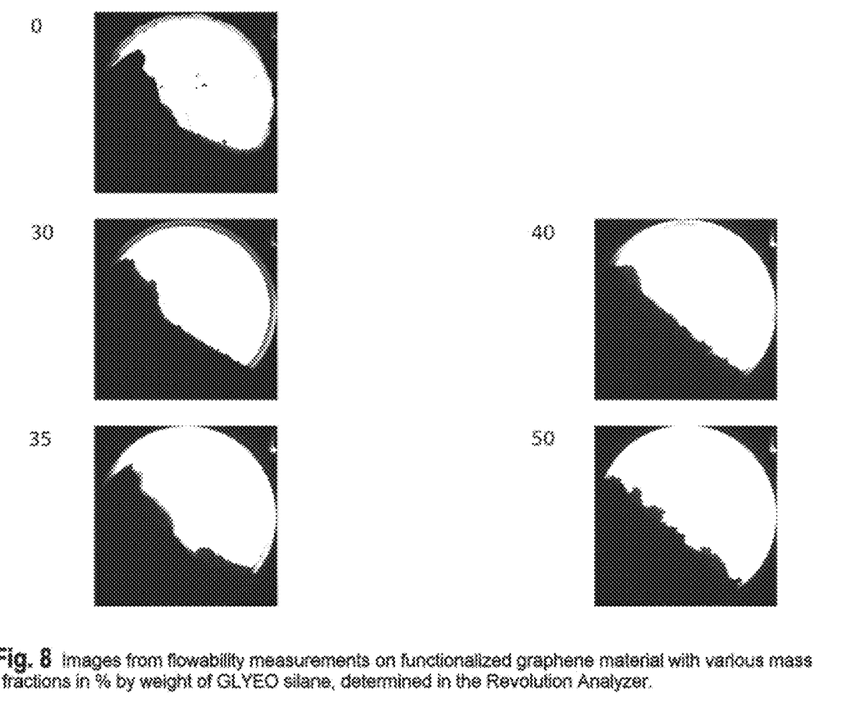
FIG. 8 shows images from flowability measurements on functionalized graphene material with various mass fractions in % by weight of GLYEO silane, determined in the Revolution Analyzer.

FIG. 8 shows camera images recorded on the Revolution Powder Analyzer at the moment of formation of avalanches of the respective functionalized graphene material of the invention for various mass fractions of silane GLYEO.

The mixing program of the Revolution Analyzer, running time 5.8 hours, was used to study the stability of the graphene materials produced according to the invention after prolonged handling. This program involved periods of relatively fast mixing at 5 rpm for 20 s alternating with periods of slower mixing at 1 rpm for 120 s in 150 cycles.

Figure 9:
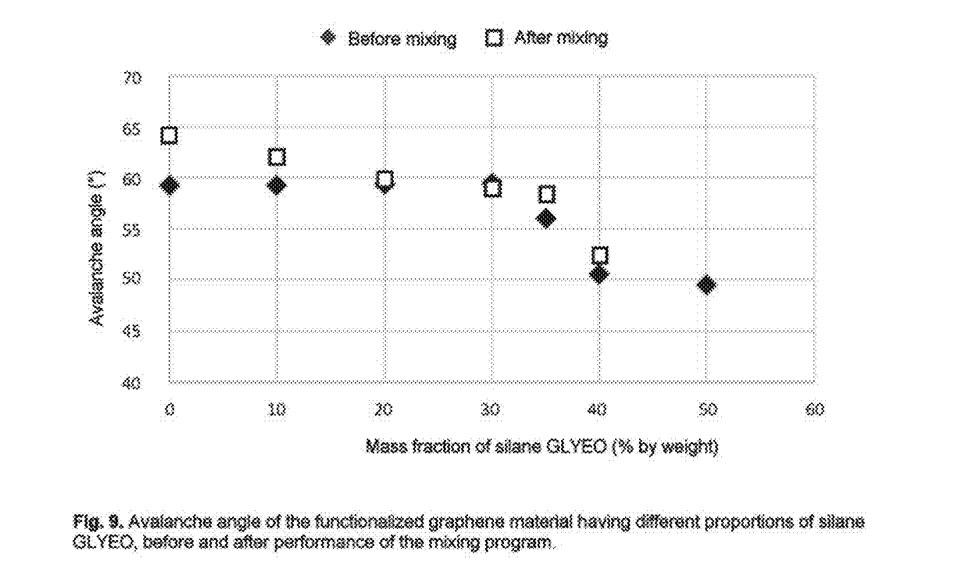
FIG. 9 shows a diagram showing an avalanche angle of a functionalized graphene material having different proportions of silane GLYEO, before and after performance of the mixing program.

After conclusion of the program, flowability was again determined as described above. As shown in FIG. 9, the average avalanche angle of the unfunctionalized graphene material increased significantly from 59 to 64°, which indicated poorer flowability.

In contrast to the above, the avalanche angle of the graphene material functionalized according to the invention with silane GLYEO exhibited no increase at al, or very little increase, after prolonged mixing.

Figure 10:
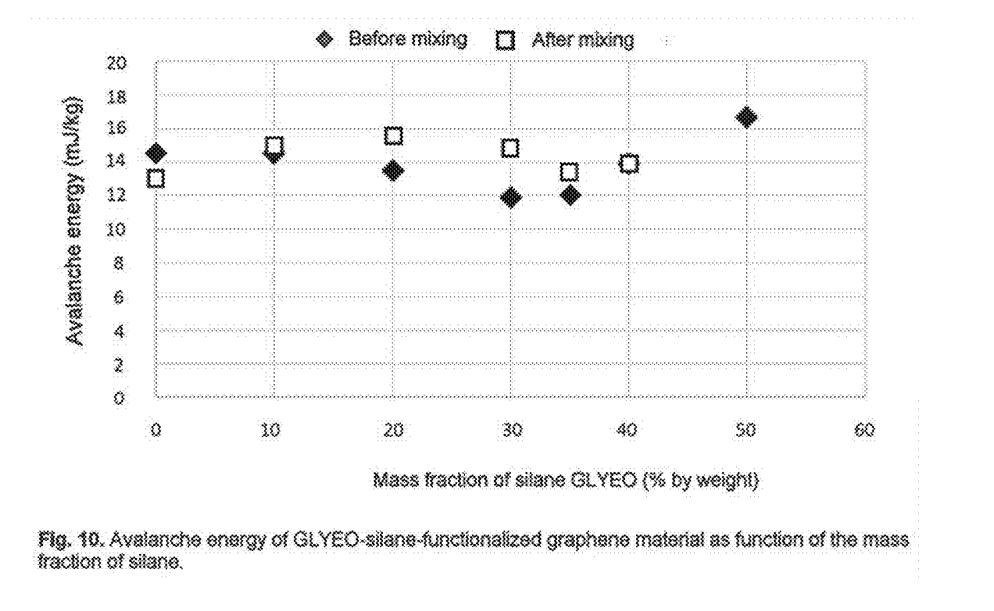
FIG. 10 shows a diagram showing avalanche energy of GLYBO-silane-functionalized graphene material as a function of the mass fraction of silane.

Another indicator of the flowability of the graphene material is the avalanche energy, which was likewise determined. When the change in avalanche energy as a function of the mass fraction of silane was very small, a lower avalanche energy indicated better flowability of the material. An optimum at about 30% to 35% by weight of silane GLYEO is discernible in FIG. 10.

The invention claimed is:

1. A process for the functionalization of graphene material, the process comprising:
  reacting the graphene material at least partially with at least one silane,
  wherein the at least partial reaction is carried out during mixing of the at least one silane with the graphene material, wherein the
  amount of silane is 5 to 40% by weight, wherein the sum of the mass fraction of the silane and graphene material is 100% by weight, and
  wherein the at least one silane is selected from the group consisting of 3-glycidyloxypropyltriethoxysilane [GLYEO], 3-aminopropyltriethoxysilane [AMEO], glycidyloxypropyltrimethoxysilane [GLYMO], 3-aminopropyltrimethoxysilane [AMMO], and a mixture thereof.

2. The process according to claim 1, wherein the at least one silane comprises two or more of the silanes.

3. The process according to claim 1, wherein a sum of mass fractions of the at least one silane is in a range of 25% to 40% by weight, and
  wherein a sum of the mass fractions of the at least one silane and of the graphene material is 100% by weight.

4. The process according to claim 1, wherein the at least partial reaction is carried out at a temperature in a range of 50° C. to 150° C.

5. The process according to claim 1, wherein the mixing is in a mixing granulator, a vessel with grinding balls, a ball mill, a three-roll mill, a stirrer, or a vessel equipped with paddles.

6. A functionalized graphene material, obtained by the process according to claim 1.

7. The functionalized graphene material according to claim 6, having:
  a bulk density of 300 g/l to 900 g/l, and/or
  a tamped density of 300 g/l to 900 g/l, and/or
  a reduction in dust generation of 50% to 80%.

8. A method, comprising:
  adding the functionalized graphene material according to claim 6 to a filler, a coating, an active material and/or electrode material in a battery, a composite material and/or foam a tyre rubber, a transmission oil and/or engine oil, or a membrane.

9. A method, comprising:
adding the functionalized graphene material according to claim 6 to a material selected from the group consisting of
a standard thermoplastic,
a technical thermoplastic,
an engineering thermoplastic,
a copolymer,
an elastomer,
a polyurethane,
a rubber,
a thermoset,
a solvent, and
an oil.

10. The process according to claim 4, wherein the at least partial reaction is carried out at a temperature in a range of 80° C. to 110° C.

11. The functionalized graphene material according to claim 7, having:
a bulk density of 500 g/l to 800 g/l, and/or
a tamped density of 500 g/l to 800 g/l, and/or
a reduction in dust generation of 55% to 75%.

12. The method according to claim 9, wherein
the standard thermoplastic is selected from the group consisting of polyethylene (PE), polypropylene (PP), polystyrene (PS), and polyvinyl chloride (PVC);
the technical thermoplastic is selected from the group consisting of polyethylene terephthalate (PET), poly(methyl methacrylate) (PMMA), polycarbonate (PC), polyoxymethylene (POM), and polyamide (PA);
the engineering thermoplastic is selected from the group consisting of polyphenylene sulfide (PPS), polyether ether ketone (PEEK), and polyethersulfone (PES);
the elastomer is selected from the group consisting of silicone, room temperature vulcanized elastomer (RTV), high temperature vulcanized elastomer (HTV), and liquid silicone rubber (LSR);
the rubber is selected from the group consisting of styrene-butadiene rubber (SBR), polybutadiene rubber (BR), and natural rubber;
the thermoset is selected from the group consisting of polyurethane, polyester resin, phenolic resin, epoxy resin, acrylate resin, and silicone resin;
the solvent is selected from the group consisting of an aprotic-non-polar solvent, an aprotic-polar solvent, and a protic solvent; and
the oil is selected from the group consisting of a mineral oil, a silicone oil, and a process oil.

13. The process according to claim 1, wherein the at least one silane comprises 3-glycidyloxypropyltriethoxysilane [GLYEO].

14. The process according to claim 1, wherein the at least one silane comprises glycidyloxypropyltrimethoxysilane [GLYMO].

15. The process according to claim 1, wherein the at least one silane comprises 3-aminopropyltrimethoxysilane [AMMO].

16. The process according to claim 1, wherein the graphene material is graphene oxide.

17. The process according to claim 13, wherein the graphene material is graphene oxide.

18. The process according to claim 17, wherein the mixing is in a mixing granulator, a vessel with grinding balls, a ball mill, a three-roll mill, a stirrer, or a vessel equipped with paddles.

* * * * *